Patented Dec. 30, 1930

1,786,501

UNITED STATES PATENT OFFICE

ARTHUR ROMAYNE MOBERG, OF MINNEAPOLIS, MINNESOTA, ASSIGNOR TO FRED O. PAIGE, JR., OF HAMMOND, INDIANA

WATER SOFTENING AND PURIFICATION

No Drawing.   Application filed April 15, 1929.   Serial No. 355,431.

The present invention relates to the purification and softening of water for industrial and municipal use and has as its general object the economical, efficient and convenient removal of suspended or colloidal matter present in or produced by softening action in such liquids, by means of an improved coagulant containing both iron and aluminum. Another object of the invention is the facilitation of efficient coagulation, filtration, etc. of finely suspended solids, or colloid solids or liquids in a liquid medium.

Heretofore, in processes for the purification of water in which coagulants are used, it has been the practice to add coagulants capable of precipitating ferric hydroxide, such as copperas or ferric chloride. In order to obtain substantially complete precipitation of the ferric hydroxide with such reagents, however, it was found that the water had to possess a sufficient alkalinity to give it a pH value of 8.5 or greater. Coagulants capable of precipitating aluminum hydroxide, such as aluminum sulfate, have also been used but these coagulants are only adapted for use with waters having a pH value of 8.0 or less, for the alumina tends to remain in solution or fails to precipitate with substantial completeness in water having a degree of alkalinity sufficient to give it a pH value of greater than 8.0.

An object of the present invention is the provision of a process which will cause coagulation with substantial completeness when applied to waters over the entire range of alkalinity ordinarily found practical for use with any type of coagulant previously employed. This and other desirable objects are accomplished by the use of a coagulant consisting of a solution of ferric chloride in which aluminum hydrate in substantial amount is dispersed in peptized form; the ferric chloride and aluminum hydrate being present in sufficient amounts to give a concentration suitable for commercial purposes. The material may be otherwise described as a commercially suitable concentration of a colloidal sol of hydrous alumina oxide peptized by the addition of ferric chloride.

The following is a specific example of my improved coagulant and method of making and using the same. In practise, quite a wide range of proportions of the materials used is permissible and the example given below is merely for purposes of illustration.

133 pounds of aluminum chloride ($AlCl_3,6H_2O$) are dissolved in 40 gallons of water. To this is added an amount of ammonium hydroxide sufficient to precipitate hydrated alumina, approximately 51 pounds, and the precipitated hydrous alumina is then separated by filtration from the mother liquors. 270 pounds of a ferric chloride solution of substantially 25 Bé. strength are then added to the separated hydrous alumina and the resulting mixture is stirred, whereupon a stable mixture is obtained which is my finished product. Hydrous alumina prepared by any other method may be employed and the proportions of the chemicals may be varied in order to vary the concentration. A drop of this mixture added to turbid water having any degree of alkalinity found practical for use with coagulants will cause the quick and substantially complete precipitation of a mixed aluminum and ferric hydroxide with resultant coagulation of the turbidity of the water.

The above coagulant is equally effective when applied to either waters in which the turbidity is naturally present or to waters in which the turbidity is the result of some chemical process to which the water has been subjected, for example, the softening of water by the precipitation process otherwise known as the lime-soda process. By removing the suspended or colloidal salts remaining after the softening process mentioned, a softer water can be obtained.

Having thus described my invention, what I claim as new and desire to secure by Letters Patent of the United States is as follows:

1. The method of purifying aqueous liquids to remove suspended impurities therefrom, which consists in subjecting the liquid to the action of a concentrated solution of ferric chloride containing peptized aluminum hydrates.

2. The method of purifying aqueous liquids to remove suspended impurities therefrom, which consists in subjecting the liquid to the action of a concentrated solution containing a hydrate of alumina which has been peptized by means of ferric chloride.

3. The method of purifying aqueous liquids to remove suspended impurities therefrom by means of mixed hydrates of iron and alumina, which comprises peptizing hydrous alumina with ferric chloride in the presence of water, and subsequently subjecting the aqueous liquid to the action of the concentrated solution of iron chloride containing peptized alumina.

4. The method of purifying aqueous liquids to remove suspended impurities therefrom by means of a colloidal solution of hydrous alumina oxide peptized by ferric chloride, consisting of subjecting the aqueous liquid to the action of a concentrated solution of peptized alumina in ferric chloride.

5. The method of softening water by the precipitation process which consists in adding to the water, lime and a solution of ferric chloride which contains peptized aluminum hydrates.

6. The method of softening water by the precipitation process which consists in adding to the water, lime and soda-ash, and a solution of ferric chloride which contains peptized aluminum hydrates.

7. The method of purifying an aqueous liquid, which consists in adding to the liquid a concentrated solution of iron chloride containing peptized alumina in order to coagulate and precipitate the suspended and colloidal impurities therein, and then separating the liquid from the precipitated and coagulated impurities.

8. The method of coagulating and precipitating the suspended and colloidal precipitates obtained as a result of the reaction of lime or soda-ash in the precipitation process of water softening, consisting in adding to the water containing the suspended and colloidal precipitates a solution of ferric chloride containing a peptized sol of hydrous alumina oxide.

9. The method of coagulating and precipitating the suspended and colloidal material occurring in an aqueous solution as the result of its treatment with a reagent, which consists in adding a solution of ferric chloride containing peptized aluminum hydrate to the water in addition to the reagent.

In testimony whereof, I have hereunto set my signature.

A. ROMAYNE MOBERG.